United States Patent [19]

Gonda et al.

[11] 4,202,293
[45] May 13, 1980

[54] DOG TRAINING COLLARS AND METHODS

[75] Inventors: Gerald J. Gonda; John Vancza, Jr., both of Tucson, Ariz.

[73] Assignee: Tri-Tronics, Inc., Tucson, Ariz.

[21] Appl. No.: 874,033

[22] Filed: Jan. 31, 1978

[51] Int. Cl.² .............................................. A01K 15/00
[52] U.S. Cl. ..................................................... 119/29
[58] Field of Search .................... 119/29, 106; 325/66, 325/118

[56] References Cited

U.S. PATENT DOCUMENTS

| | | | |
|---|---|---|---|
| 2,741,224 | 4/1956 | Putnam | 119/29 |
| 3,310,754 | 3/1967 | Stewart | 119/29 |
| 3,589,337 | 6/1971 | Doss | 119/29 |
| 3,608,524 | 9/1971 | Waltz | 119/29 |
| 3,777,712 | 12/1973 | Gardner | 119/29 |
| 3,823,691 | 7/1974 | Morgan | 119/29 |
| 3,980,051 | 9/1976 | Fury | 119/29 |
| 4,088,094 | 5/1978 | Howard | 119/29 |

Primary Examiner—Jay N. Eskovitz
Attorney, Agent, or Firm—Wills, Green & Mueth Law Corporation

[57] ABSTRACT

In order to train a dog not to bark, a device attached to the dog's collar emits a characteristic sound whenever he barks, which sound may be accompanied on some occasions by a light electrical shock acting to condition the dog to dislike the sound more than he otherwise would.

18 Claims, 5 Drawing Figures

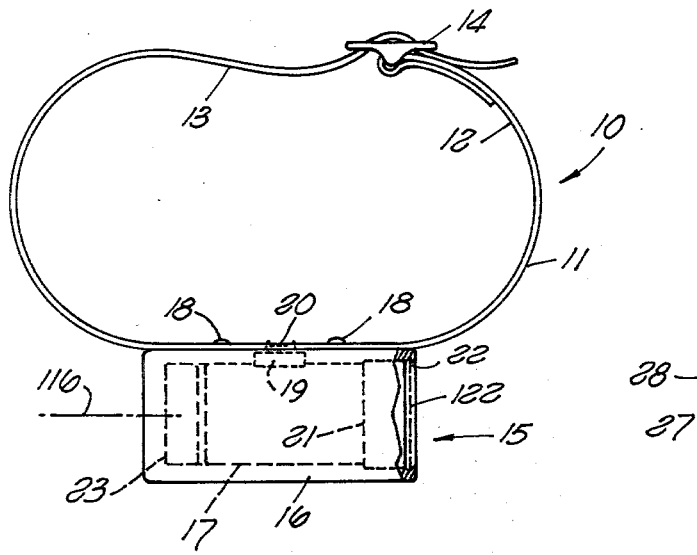

4,202,293

DOG TRAINING COLLARS AND METHODS

BACKGROUND OF THE INVENTION

This invention relates to improved devices and methods for training dogs not to bark.

There have in the past been devised dog training collars which have included devices for applying an electrical shock to a dog each time that he barks. These devices have included microphones which pick up the barking sound, and then energize circuitry for producing the electrical shock. However, such collars relying entirely on repeated shocking of the animal have recently fallen into disfavor as inhumane.

SUMMARY OF THE INVENTION

The present invention provides improved devices and methods for training a dog not to bark, by a conditioning effect which relies in large part on the emission of an unpleasant sound when the dog barks. The effect of the sound can be enhanced by accompanying it on some but preferably not all barking occasions with a light electrical shocking of the animal. This shocking in association with the sound preconditions the dog to dislike the sound more than he otherwise would, and to thus react better to the sound alone on subsequent actuations than if he had never felt the shock in association with the sound. In order to avoid excessive use of the shocking circuit, it may be designed to require manual resetting by the trainer after each cycle of shocking operation, so that each time the circuit is reset it applies a shock with the sound only once (or another limited number of times), following which the device returns to a sound-only condition until again purposely reset.

BRIEF DESCRIPTION OF THE DRAWINGS

The above and other features and objects of the invention will be better understood from the following detailed description of the typical embodiments illustrated in the accompanying drawings, in which:

FIG. 1 is a front view of an automatic dog training collar assembly constructed in accordance with the invention;

FIG. 2 illustrates the electronic circuit of the FIG. 1 device;

FIG. 3 is a front elevational view of a variational form of the invention;

FIG. 5 illustrates diagrammatically a remote controlled form of the invention.

DESCRIPTION OF THE PREFERRED EMBODIMENTS

Figure 4:
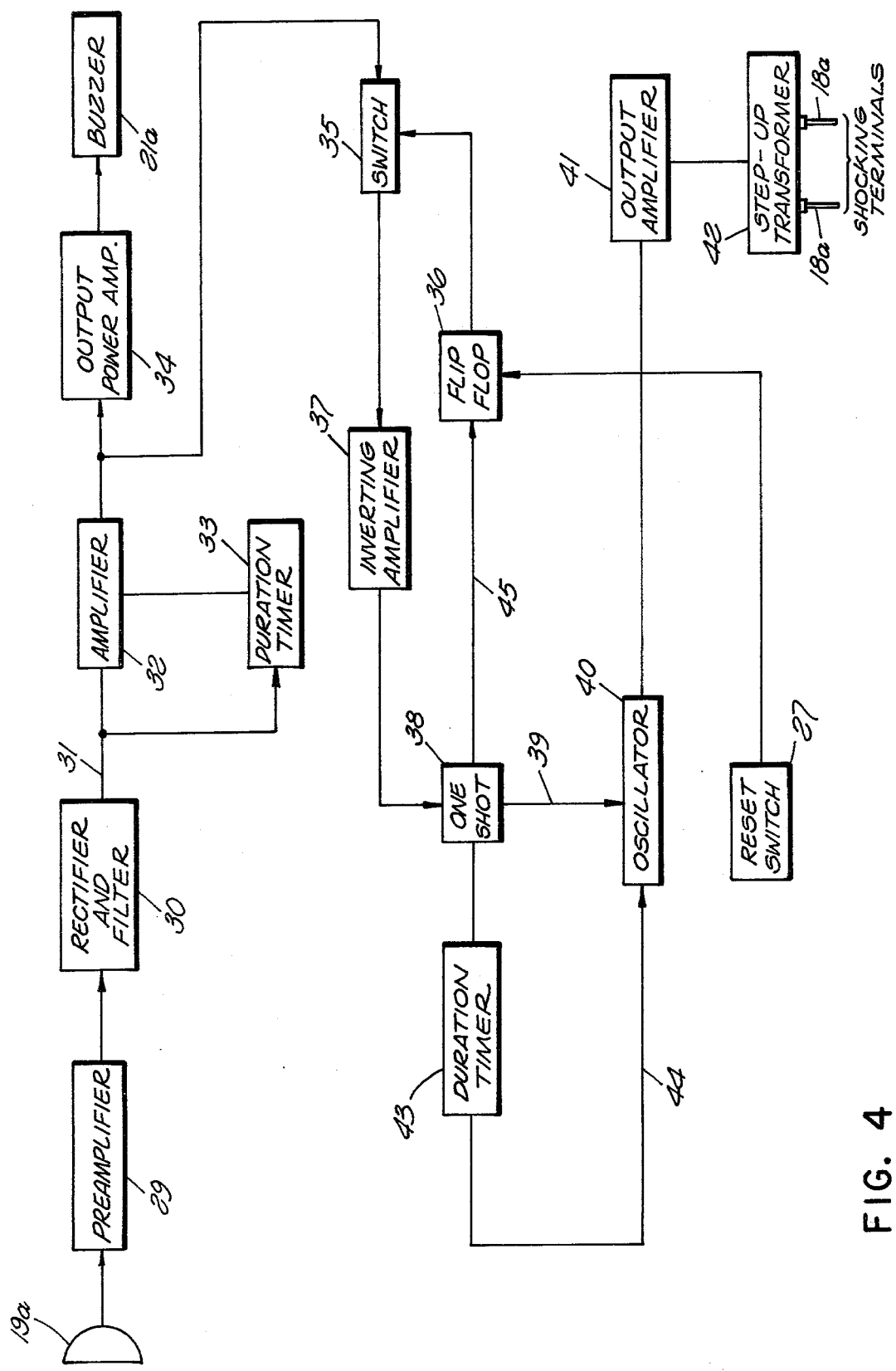
FIG. 4 is a block diagram representing the circuit of the FIG. 3 device.

The device 10 illustrated in FIG. 1 includes a dog collar 11 adapted to be placed about the neck of a dog, and having two opposite end portions 12 and 13 adapted to be secured together in any convenient manner, as by a buckle 14 carried by end 12 and engageable with openings formed in the end 13. The collar 11 carries a unit 15, having a case 16 within which the electronic circuitry 17 of the dog training device is contained. The case 16 is secured to the collar in any appropriate manner, either permanently or removably, and preferably by provision of a pair of rivets, headed screws of other fasteners represented at 18 extending through openings in the collar and connecting into the case. The circuitry 17 includes a microphone 19 contained within the case and facing inwardly toward the inside of the collar to receive sound from the dog's throat when he barks. To facilitate reception of and response to this sound, the case and collar may have openings 20 opposite the microphone and through which the barking sound can pass to the microphone. The circuitry also includes a sound emitting device 21 contained within the case, preferably taking the form of a vibrator type buzzer which when energized produces a high intensity sound distasteful to the animal. This sound produced by the buzzer may leave the unit 15 through an opening 22 formed in an end wall of the unit opposite the buzzer and across which a screen 122 extends. The case 16 may typically be externally cylindrical about a longitudinal axis 116 of the device. The electronic circuitry within the case is electrically energized by a preferably rechargeable battery 23 contained in the case.

Referring now to the circuit of FIG. 2, the microphone 19 is of the dynamic type, acting to produce a small audio frequency electrical signal in lines leading to the base and emitter respectively of a first transistor Q1. A coupling capacitor C1 is connected into the line from the microphone to the transistor base. Transistor Q1 and a second transistor Q2, connected as illustrated, form with the related resistors R1, R2, R3 and R4, and capacitor C3, a conventional two stage amplifier, which amplifies the signal from microphone 19 and delivers it as an amplified audio frequency signal through a coupling capacitor C2. The resistor R4 and capacitor C3 of the two stage amplifier determine the range of frequencies to which the amplifier circuit may respond, and are preferably of values giving a frequency response range from 0.5 to 2.5 kilohertz. This range includes most of the frequencies present in a barking sound.

The amplified audio frequency signal passed by coupling capacitor C2 is conducted to the base of a third transistor Q3, and is also conducted through a resistor R5 to the base of a fourth transistor Q4. The emitter of transistor Q3 is connected through a biasing resistor R6 to the positive side of battery 23, while the collector of transistor Q3 is connected through resistor R7 to ground and the opposite side of the battery. Q3 responds to or is turned on by the first negative going signal of the audio frequency signal delivered to its base, to thereby conduct current between the emitter and collector of transistor Q3 and apply power to a capacitor C4 connected between the positive power source and the base of transistor Q4 and emitter of transistor Q3.

Such application of power to capacitor C4 through transistor Q3 commences charging of the capacitor through resistor R7. This RC circuit consisting of capacitor C4 and resistor R7 has a relatively long time constant desirably of about 0.1 seconds, so that the potential applied by capacitor C4 between the emitter and base of transistor Q4 gradually increases over an extended period of time. After only a relatively small portion of this extended charging time of capacitor C4, the potential applied to the base of transistor Q4 reaches a value acting to turn on the transistor Q4 and produce a direct current signal or pulse of extended duration in line 24 leading from the collector of transistor Q4. As an example, if the full charging time of capacitor C4 is 0.1 seconds, the transistor Q4 may be turned on after capacitor C4 has been charging for a period less than 0.05 seconds, say for example 0.04 seconds. The direct current output signal in line 24 will then continue for the remainder of the charging period of the capacitor, and through its relatively long discharging period (10 seconds).

As soon as the transistor Q4 is turned on and produces a signal in line 24, this signal acts immediately to cause energization of the previously mentioned buzzer 21, which produces a shrill sound audible to the animal, and desirably of a frequency of say about 3 kilohertz. Such energization of the buzzer is attained by conduction of the signal in line 24 through resistor R10 and an amplifier represented diagrammatically at 25 to the base of a transistor Q6 which is connected in a Darlington type circuit with a second transistor Q7. The collector and emitter of transistor Q7 are connected into the buzzer circuit, to energize it. It is contemplated that in some instances the amplifier 25 may be omitted, though it is preferred that the amplifier be present in the circuit in order to insure effective response of the circuit to a barking sound even through the potential of battery 23 may decrease somewhat.

The closure of the circuit through transistor Q4 to line 24 in addition to commencing operation of buzzer 21, also has an additional effect of applying potential across an RC circuit, consisting of resistor R9 and capacitor C5, connected as shown to transistor Q5. A resistor R8 is connected across the RC circuit, and functions as a biasing resistor. As will be understood, capacitor C5 commences to charge at the same time that buzzer 21 is placed in operation, and after a predetermined timed interval reaches a condition in which the potential applied to the base of transistor Q5 is great enough to turn that transistor on, and connect the point 26 between resistor R10 and amplifier 25 to ground. When point 26 is thus grounded, this turns off transistors Q6 and Q7 and the buzzer 21. The time constant of the RC circuit consisting of resistor R9 and capacitor C5 in this way determines the length of emission of the high intensity sound produced by buzzer 21. This time constant is preferably at least about ½ of a second, and desirably at least about 0.8 seconds. The closure of the circuit through the collector and emitter of transistor Q5 also permits capacitor C5 to discharge, but its discharging circuit is such as to require a predetermined timed interval for the charge on the capacitor to decrease to a value low enough to cause opening of the circuit through the collector and emitter of transistor Q5 and thus permit re-energization of the buzzer through transistors Q6 and Q7. This timed interval is preferably considerably greater than the interval required for charging the capacitor to the value for turning transistor Q5 on. More specifically, the time required for decay of the charge on capacitor C5 to a value turning transistor Q5 off should be more than one second, and desirably about two seconds.

While it will be understood that the solid state electronic circuitry of FIG. 2 may be varied, and the values of the different components can be changed, we will, in order to assure a full disclosure of the invention, set forth below the types of transistors, and capacitor and resistor values, which may be employed in a typical circuit connected as shown in FIG. 2:

| The Component | Type or Value |
|---|---|
| Transistor Q1 | Type 2N2540 |
| Transistor Q2 | Type 2N2540 |
| Transistor Q3 | Type 2N5138 |
| Transistor Q4 | Type 2N5138 |
| Transistor Q5 | Type 2N5133 |
| Transistor Q6 | Type 2N5134 |
| Transistor Q7 | Type 2N4921 |
| Capacitor C1 | .001 microfarad |
| Capacitor C2 | .047 microfarad |
| Capacitor C3 | .1 microfarad |
| Capacitor C4 | 10 microfarad |
| Capacitor C5 | 77 microfarad |
| Resistor R1 | 330K |
| Resistor R2 | 3.9 megohm |
| Resistor R3 | 100K |
| Resistor R4 | 68K |
| Resistor R5 | 1 megohm |
| Resistor R6 | 230K |
| Resistor R7 | 10K |
| Resistor R8 | 100K |
| Resistor R9 | 27K |
| Resistor R10 | 470 ohm |
| Battery 23 | 6 volt |

In placing the device 10 of FIG. 1 in use, the first step is of course to position the collar 11 about the dog's neck, with the unit 15 closely adjacent the animal, and with the microphone 19 positioned to receive the barking sounds from the animal's throat through openings 20. When the dog barks, the barking sound acts through microphone 19 to produce an amplified audio frequency output at the right side of capacitor C2, and the first negative going fluctuation of this audio signal output turns transistor Q3 on to commence charging of capacitor C4, as discussed. After a predetermined time interval (0.04 seconds when the components have the values set forth above), capacitor C4 turns transistor Q4 on, to produce a direct current signal in line 24, which is amplified by amplifier 25 and then acts to immediately turn transistors Q6 and Q7 on, thereby commencing operaton of buzzer 21 after the timed interval determined by the RC circuit composed of capacitor C4 and resistor R5. The capacitor C4 and its resistor R5, in preventing energization of the buzzer until Q3 has been turned on for a predetermined interval, prevent unwanted response of the circuit to instantaneous or short duration knocking or tapping sounds which may occur when the animal causes the unit 15 to strike against a wall, furniture or other object. In this way, the circuit will respond only when the dog barks.

At the same time that the buzzer is turned on, capacitor C5 commences to charge through resistor R9, and this timing circuit ultimately turns transistor Q5 on after a predetermined timed interval (0.8 seconds when the values are as discussed) following initial energization of the buzzer. Thus, buzzer 21 turns on after continuation of the barking sound for 0.8 seconds, and turns off after the buzzer has been in operation for a second 0.8 seconds. After the buzzer is turned off, a further timed interval (2 seconds in the discussed circuit) must elapse before transistor Q5 will turn off and permit re-energization of the buzzer.

After the dog has barked a few times, and each time been subjected to the intense sound emitted by buzzer 22, he becomes conditioned by the unpleasant sound to avoid barking. The collar may then be removed from the animal, who will thereafter refrain from barking excessively because of his recollection of the sound produced by the training collar.

FIGS. 3 and 4 show a variational type of bark trainer 10a which is very similar to the device 10 of FIGS. 1 and 2 except that the device of FIGS. 3 and 4 is adapted to apply a light electrical shock to the animal in conjunction with the emitted sound on some but preferably not all occasions when the animal barks. In FIG. 3, the device 15a secured to collar 11a includes a typically cylindrical housing 16a similar to housing 16 of FIG. 1 and secured to the collar by two spaced metal fasteners 18a. These fasteners extend through apertures in the collar and connect rigidly to the case 16a, and also are electrically connected within the case to the electronic circuitry therein to function as terminals for conducting the shocking current to the animal. In order to assure proper contact with the animal, the terminals 18a may have projecting portions 118a long enough to extend through the animal's fur and contact his skin.

As in the first form of the invention, the case contains a microphone 19a which receives the barking sounds through apertures 20a formed in the collar. Also, the case contains a buzzer 21a which emits sound through an end opening 22a of the case. The battery 23a may be rechargeable through terminals 123a projecting to the outside of the case for attachment to a connector of a charging circuit. Besides the elements thus far described, the case 16a also contains the other components of the circuit illustrated in FIG. 4, including specifically a reset switch 27 which is actuable by manual depression of a pushbutton element 28 projecting to the outside of the case, and which acts when the pushbutton is depressed to cause energization of the shocking terminals on the next successive operation of the buzzer.

With reference now to the block diagram of FIG. 4, it is noted that the signal produced by microphone 19a is first fed to a pre-amplifier 29, and after amplification is delivered to a rectifier and filter 30 which produces a direct current output in the line 31 each time that a barking sound is picked up by the microphone. This direct current signal is delivered to an amplifier 32 and a duration timer 33, with the latter functioning to turn the amplifier on only after continuance of the barking sound for a predetermined interval of time, say for example one second. Thus, as in the previously discussed circuit, any shorter duration knocking noises or the like sensed by the microphone will be rejected and not transmitted through amplifier 32, to in this way prevent unwanted actuation of the buzzer by sounds other than a somewhat extended barking sound. When the DC pulse continues for the predetermined interval, timer 33 turns on amplifier 32, to conduct an amplified signal to an output power amplifier 34, which energizes the buzzer 21a to emit its characteristic high pitch sound. The output signal from amplifier 32 is also conducted to a switch 35 controlled by the manually operated reset switch 27 through a flip-flop 36. If prior to a particular barking occasion the switch 27 has been manually reset by pressing element 28, the flip-flop 36 will by such actuation of switch 27 be reset to a condition in which it turns switch 35 on, to conduct the signal from amplifier 32 to an inverting amplifier 37, and then to a one-shot multivibrator 38. This one-shot then delivers a timed control signal through a line 39 to an oscillator 40, which produces an alternating current output delivered through an output amplifier 41 and voltage step-up transformer 42 to the shocking terminals 18a. The voltage at terminals 18a is sufficiently high to be felt by and be distasteful to the animal, but is not high enough, or capable of producing enough current flow, to harm the animal in any way. For example, the output at terminals 18a may typically be about 3000 volts, typically at a frequency between about 400 and 500 cycles per second.

The shocking potential at terminals 18a continues for the period that the one-shot remains in its actuated state, and is turned off by the one-shot at the end of that period (preferably after a shocking interval of 80 milliseconds). A duration timer 43 functioning as a fail-safe device acts to turn off the oscillator 40 if for any reason the one-shot does not do so. To achieve this result, timer 43 receives a signal from the one-shot multivibrator 38 simultaneously with the delivery of the signal through line 39 which turns on oscillator 40. After a predetermined timed delay interval following energization of oscillator 40, the duration timer 43 delivers a signal through line 44 to the oscillator which will turn it off if it is not already off. If the one-shot has an 80 millisecond cycle, the delay period of timer 43 may typically be somewhat longer, say 90 milliseconds, so that on normal operation the timer 43 never really completes its cycle but is reset by the one-shot before completion of that cycle. In any event, it is preferred that the period of energization of the shocking terminals be substantially less than the period of operation of buzzer 21a, as determined by timer 33. For example, it is currently found preferable taht time 33 be designed to continue operation of the buzzer 21a for at least about three fourths of a second on each barking occasion, while the electrical shock delivered through terminals 18a should continue for not over about 150 milliseconds, preferably about 80 milliseconds.

Once the shocking potential has been turned off by the one-shot 38, the electrical shock will not be repeated the next time that the dog barks unless the reset switch 27 has again been manually actuated. To attain this one-time action, another output from the one-shot multivibrator 38 is delivered through line 45 back to flip-flop 36, to return it to a condition in which switch 35 is turned off. The switch 35 then remains in this condition until the reset switch 27 is again actuated.

In using the device of FIGS. 3 and 4, the collar is placed about the dog's neck in the same manner as is the device of FIG. 1, and the functioning is the same except with regard to actuation of pushbutton 28. Unless this button has been pressed inwardly before a particular barking occasion, the device will function when the dog barks to emit only sound. Whenever button 28 is momentarily pressed inwardly, such actuation of reset switch 27 acts to enable the shocking circuitry for application of an electrical shock to the dog in conjunction with emisson of the sound on the next barking occasion but not thereafter. The application of the shock at the same time that the sound is emitted conditions the animal to dislike the sound even more than in the first form of the invention. Consequently, when the animal barks at a later time and hears only the sound without feeling the shock, he has a greatly enhanced reaction to the sound.

FIG. 5 illustrates diagrammatically another form of the invention, which includes a unit 15b carried by a dog collar 11b and adapted to be turned on and off by a hand held remote control device 39. The unit 15b includes a sound emitting buzzer and shocking terminals and circuitry, as in the second form of the invention, and also includes a radio receiver or other receiver responsive to signals from a transmitter in the control device 39 to turn the buzzer and shocking current on and off. Preferably, control device 39 has two pushbuttons 40 and 41, one of which will cause emission of a timed characteristics sound from the buzzer in unit 15b, and the other of which will cause the emission of a timed characteristic sound followed immediately by the application of a light electric shock.

While certain specific embodiments of the present invention have been disclosed as typical, the invention is of course not limited to these particular forms, but rather is applicable broadly to all such variations as fall within the scope of the appended claims.

I claim:

1. A dog training device comprising:

a case adapted to be carried by a dog collar;

sound producing means carried by said case and adapted while the device is being worn by a dog to emit a sound intended to urge the dog to stop barking;

shocking means carried by said case and operable to electrically shock a dog wearing the device; and control means operable to actuate said shocking means to shock the dog on an initial actuation of said sound producing means but not on subsequent actuations thereof, said control means including means for selectively resetting said shocking means, if necessary, to shock the dog on a next successive actuation of said sound producing means following each reset operation, but not on other actuations thereof.

2. A dog training device as recited in claim 1, in which said control means include a receiver carried by said case and a transmitter acting remotely through said receiver to control operation of said sound producing means and said shocking means.

3. A dog training device as recited in claim 1 wherein said sound producing means includes electrical buzzer means and said sound intended to urge the dog to stop barking is a high intensity sound audible to both humans and dogs.

4. A dog training device comprising:

a case adapted to be carried by a dog collar;

sound actuated means responsive to barking of a dog wearing said device;

sound producing means carried by said case and operable automatically by said sound actuated means to emit a training sound when the dog barks;

shocking means carried by said case and operable to electrically shock a dog wearing the device; and controls means operable to actuate said shocking means to shock the dog on an initial actuation of said sound producing means but not on subsequent actuations thereof, said control means including means for selectively resetting said shocking means, if necessary, to shock the dog on a next successive actuation of said sound producing means following each reset operation, but not on other actuations thereof.

5. A dog training device as recited in claim 4, in which said sound actuated means include a microphone carried by the case at a location to respond to barking of the dog, and electrical circuitry operable by said microphone to commence operation of said sound producing means when the dog barks.

6. A dog training device as recited in claim 4, in which said sound actuated means are constructed to commence operation of said sound producing means only after continuance of a barking sound for a predetermined interval long enough to prevent unwanted actuation of the sound producing means by instantaneous contacting of the device with an object.

7. A dog training device as recited in claim 4, in which said sound actuated means include a microphone carried by said case and responsive to a barking sound, and a timing circuit controlled by signals from said microphone and acting to actuate said sound producing means to emit said training sound only after continuance of bark induced signals from the microphone for a predetermined interval.

8. A dog training device as recited in claim 4, in which said sound actuated means include means operable upon commencement of emission of said training sound to continue emission of the training sound for a predetermined interval and then terminate it.

9. A dog training device as recited in claim 4, in which said sound producing means include circuitry automatically operable upon cessation of the emission of said training sound by said sound producing means to prevent reactuation of said sound producing means and re-commencement of the training sound for an interval of time.

10. A dog training device as recited in claim 4, in which said sound producing means include an electrically energized sound emitter, solid state switching circuitry actuable by said sound actuated means to turn on said sound emitter, and an electrical timing circuit including a capacitor which commences to charge when said solid state switching circuitry turns the sound emitter on and which acts upon attainment of a predetermined charge in the capacitor to actuate said control circuitry to turn the sound emitter off.

11. A dog training device as recited in claim 10, in which said timing circuit acts after the sound emitter has been turned off to prevent re-energization of the sound emitter for an interval of time and until the charge on said capacitor has decayed to a predetermined level.

12. A dog training device as recited in claim 4, in which said sound actuated means include a microphone for producing an audio frequency signal when the dog barks, and circuitry responsive to said audio frequency signal to produce an essentially direct current output of extended duration as compared with the fluctuations of said audio frequency signal, said sound producing means being responsive to said essentially direct current signal to produce said training sound.

13. A dog training device as recited in claim 4, in which said sound actuated means include a microphone responsive to a barking sound, and amplifier for amplifying an audio frequency signal from said microphone, a capacitor, a solid state switching element responsive to initiation of an audio frequency signal from said amplifier to close a charging circuit to said capacitor, a second solid state switching element responsive to attainment of a predetermined charge in said capacitor to produce an essentially direct current signal of extended duration for controlling said sound producing means, said sound producing means including an electrically energized sound emitter, a solid state control circuit for said sound emitter responsive to commencement of said essentially direct current signal to energize the sound emitter and commence emission of said sound, an additional switching element, and a timing circuit including a capacitor connected to said second switching element to commence charging of the capacitor when said essentially direct current signal commences and acting upon attainment of a predetermined charge to actuate said additional switching element in a relation causing it to actuate said output control circuitry to turn off the sound emitter.

14. A dog training device as recited in claim 4, wherein said shocking means are operable to automatically shock the dog when he barks, and including timer means controlling the duration of said training sound and of said shock and giving the shock a shorter duration than the training sound.

15. A dog training device as recited in claim 4, wherein said sound producing means includes electrical buzzer means and said training sound is a high intensity sound audible to both humans and dogs.

16. A dog training device comprising:
a dog collar;
a case carried by said collar;
a microphone carried by said case responsive to barking of a dog wearing said device;
means operable by said microphone to produce a control signal if a barking sound continues for a predetermined interval;
sound producing means responsive to said signal to emit a predetermined characteristic sound for a timed interval each time the dog barks;
shocking terminals carried by said case for contacting and applying an electrical shock to the dog; and
circuitry operable in a predetermined active condition to respond to said signal and energize said shocking terminals on a first actuation of said sound producing means, and operable to automatically de-energize said shocking means for subsequent actuations of said sound producing means;
said circuitry including manually actuated reset means for selectively re-actuating said circuitry to said active condition, if necessary, from an inactive condition in which it will not respond to said signal and will not energize the shocking terminals when the dog barks.

17. A dog training device as recited in claim 16, in which said circuitry includes an oscillator for energizing said terminals, and a one-shot multivibrator operable by said signal to turn on said oscillator for a predetermined timed interval; said reset means including a manually actuated reset switch, a flip-flop actuable from a first state to a second state by said reset switch, and a control switch actuable by the flip-flop to pass said signal to the multivibrator; said multivibrator being actuable by said signal to return the flip-flop from said second state to said first state.

18. The method of training a dog that comprises:
attaching a training device to the dog's neck;
causing said device to automatically emit a characteristic sound when the dog barks while the device is carried by the dog;
electrically shocking the dog by said device at approximately the time of the initial emission of said sound but not on subsequent emissions of said sound; and
selectively resetting said device, if necessary, to shock the dog on the next succeeding emission of said sound.

* * * * *